(12) United States Patent
Ryann

(10) Patent No.: US 7,505,793 B2
(45) Date of Patent: Mar. 17, 2009

(54) WIRELESS EARPIECE ASSEMBLY

(76) Inventor: William Frederick Ryann, 8039 Dove Flight, San Antonio, TX (US) 78250

( * ) Notice: Subject to any disclaimer, the term of this patent is extended or adjusted under 35 U.S.C. 154(b) by 323 days.

(21) Appl. No.: 11/218,392

(22) Filed: Aug. 29, 2005

(65) Prior Publication Data
US 2007/0049362 A1 Mar. 1, 2007

(51) Int. Cl.
*H04M 1/00* (2006.01)
(52) U.S. Cl. ......... 455/569.1; 455/41.2; 455/575.7; 455/575.1; 455/575.6; 381/314; 381/77
(58) Field of Classification Search ......... 455/569.1, 455/41.2, 557, 575.1, 575.6, 90.3; 381/314, 381/77
See application file for complete search history.

(56) References Cited

U.S. PATENT DOCUMENTS

| | | | |
|---|---|---|---|
| D372,312 S | 7/1996 | Lange | |
| 6,091,546 A | 7/2000 | Spitzer | |
| 6,091,832 A | 7/2000 | Shurman | |
| 6,424,820 B1 * | 7/2002 | Burdick et al. | 455/41.1 |
| 6,760,459 B2 | 7/2004 | Bae | |
| 6,823,171 B1 | 11/2004 | Kaario | |
| 6,868,284 B2 | 3/2005 | Bae | |
| 2003/0134666 A1 * | 7/2003 | Fletcher et al. | 455/568 |
| 2004/0066948 A1 | 4/2004 | Bogeskov-Jensen | |
| 2004/0198391 A1 | 10/2004 | Sanders | |
| 2004/0239874 A1 | 12/2004 | Swab | |
| 2005/0046789 A1 | 3/2005 | Jannard | |
| 2005/0046790 A1 | 3/2005 | Jannard | |
| 2005/0107131 A1 * | 5/2005 | Abramov | 455/569.1 |
| 2005/0143140 A1 * | 6/2005 | Sanders et al. | 455/569.1 |
| 2005/0154593 A1 * | 7/2005 | Denatale | 704/275 |
| 2005/0207588 A1 * | 9/2005 | Biegelsen | 381/77 |
| 2006/0039577 A1 * | 2/2006 | Sanguino et al. | 381/315 |
| 2007/0009120 A1 * | 1/2007 | Algazi et al. | 381/310 |

OTHER PUBLICATIONS

U.S. Appl. No. 11/218,391, filed Aug. 29, 2005, Ryann, (Wireless Earpiece).
U.S. Appl. No. 11/218,860, filed Aug. 29, 2005, Ryann, (Wireless Earring Assembly).

* cited by examiner

*Primary Examiner*—Minh D Dao

(57) ABSTRACT

A wireless earpiece assembly configured to physically contact a user exclusively at an ear support behind a user's ear when in use. The ear support does not exceed about 0.25 inches in width. The assembly is configured to distribute a significant portion of its bulk away from the isolated location of a user's ear for long term user comfort without sacrifice of audio or communicational integrity. The wireless earpiece assembly simultaneously eliminates the use of any conventional extraneous wiring in order to optimize the un-encumbering user-friendly advantages afforded by wireless technology.

21 Claims, 5 Drawing Sheets

WIRELESS EARPIECE ASSEMBLY

BACKGROUND

Embodiments described relate to earpieces for coupling or pairing to an audio device. In particular, embodiments relate to earpiece assemblies for wireless pairing to mobile audio devices such as cell phones.

BACKGROUND OF THE RELATED ART

Mobile audio devices are experiencing a dramatic growth in utilization. Such devices have evolved from transistor radios, televisions and mobile cassette players to more modern communication devices such as the mobile cell phones of today. Recently, it has become commonplace for mobile audio devices to incorporate non-audio functionality, such as cell phones incorporating picture taking, calendaring, e-mailing, internet web browsing, and other features. Similarly, different types of mobile audio devices are beginning to merge, such as cell phones that include the capacity to play digital music.

As mobile audio devices continue to play an ever increasing role in people's lives, the importance of ergonomic utilization of such devices has also increased. For example, an audio output mechanism such as an earpiece or headphones is often wired to a handheld mobile audio device such as a cell phone. In this manner, the cell phone need not be held right at the user's ear during operation. The wired earpiece allows the cell phone to be kept away from the user's ear without requiring use of less discrete means such as a speakerphone function. Use of a wired earpiece with the cell phone in this manner provides a degree of hands-free user-friendliness. Keeping the user's hands more free can improve safety when the user is simultaneously engaged in other tasks. For example, in many jurisdictions, hands-free use of cell phones has become required by law during operation of a motor vehicle as a matter of public safety.

In order to further address ergonomic, hands-free, and other user-friendly objectives when utilizing a mobile audio device, an earpiece may be employed in a wireless manner. For example, wireless earpieces have been conceived and developed which do not require physical wiring directly to the mobile audio device. That is, a wireless earpiece may be secured at a user's ear with a cell phone wirelessly coupled or "paired" thereto. In this manner, cumbersome wiring from the earpiece all the way to the cell phone is eliminated. The cell phone may even be somewhat remote from the user during use. For example, the driver of an automobile may be using a cell phone via a wireless earpiece while the potentially distracting cell phone easily remains away from the driver's hands or immediate vicinity.

Unfortunately, a high quality wireless earpiece must be of dramatically increased size as compared to a traditional wired mechanism. This is because, in order to provide high quality wireless capability, the wireless earpiece is equipped with a power source, microphone, transceiver, antenna, microprocessor, and potentially other components, all of which are not required in a traditional wired earpiece. In a traditional wired earpiece there is present a physically wired connection to the cell phone where such components can be maintained, distributed, or rendered unnecessary altogether. However, the nature of a wireless earpiece necessitates the inclusion of wireless and other components right at the earpiece. Thus, the earpiece often includes a large bulky casing for housing all of these components in addition to providing a speaker and other traditional wired earpiece components.

As an alternative to a bulky casing, inductive loop and other similar devices may be available, but are generally much less desirable. Inductive loop devices involve the inherent cumbersome nature of forming an inductive loop about the user and result in generally low audio integrity and overall quality.

The large wireless earpiece described above is configured with a casing large enough to house the above noted components and is configured to rest over, behind, or around the back of the user's ear. It is the user's ear that is forced to bear the bulk of the entire earpiece. In total, this may include a casing having a bulk of 3 to 5 inches across and up to ¾ of an inch wide or more, all resting right at the user's ear, sandwiched between the user's ear and head, blocking the auditory canal of the user's ear, or taking some other bulky and cumbersome configuration.

Employing a wireless earpiece contributing extensive bulk at the user's ear sacrifices long term user comfort for the short term user-friendliness provided by the wireless nature of the earpiece. Extensive wear of such wireless earpieces can be quite uncomfortable, require frequent placement, replacement, and repositioning, and render the user-friendliness of 'wireless capacity' to be of diminishing value to the user. Furthermore, attempts to redistribute the bulk resulting from such wireless earpiece components away from the user's ear to other nearby accessories to accommodate them, such as eyewear or headwear, similarly sacrifices user-friendliness. For example, the user may not require or desire wearing prescription glasses, sunglasses, hats, headphones, or other cumbersome and otherwise generally unnecessary accessories.

SUMMARY

A wireless earpiece assembly is provided having an ear support coupled to a casing by way of a casing support. The casing is for housing a component of the assembly. The casing support displaces a bulk of the casing away from the user's ear to a location above the user's neckline.

DETAILED DESCRIPTION

Embodiments are described with reference to certain earpiece assemblies having wireless features. These may include single ear earpiece assemblies or those delivering sound to both of a user's ears in stereo akin to traditional headphones. Regardless, embodiments described herein may be particularly useful when a wireless earpiece assembly is to be worn for any extended period of time. Additionally, this patent document has been filed in conjunction with Wireless Earpiece of William F. Ryann which is hereby incorporated herein by reference in its entirety. A complete text of this document has been provided with this filing.

Figure 1:
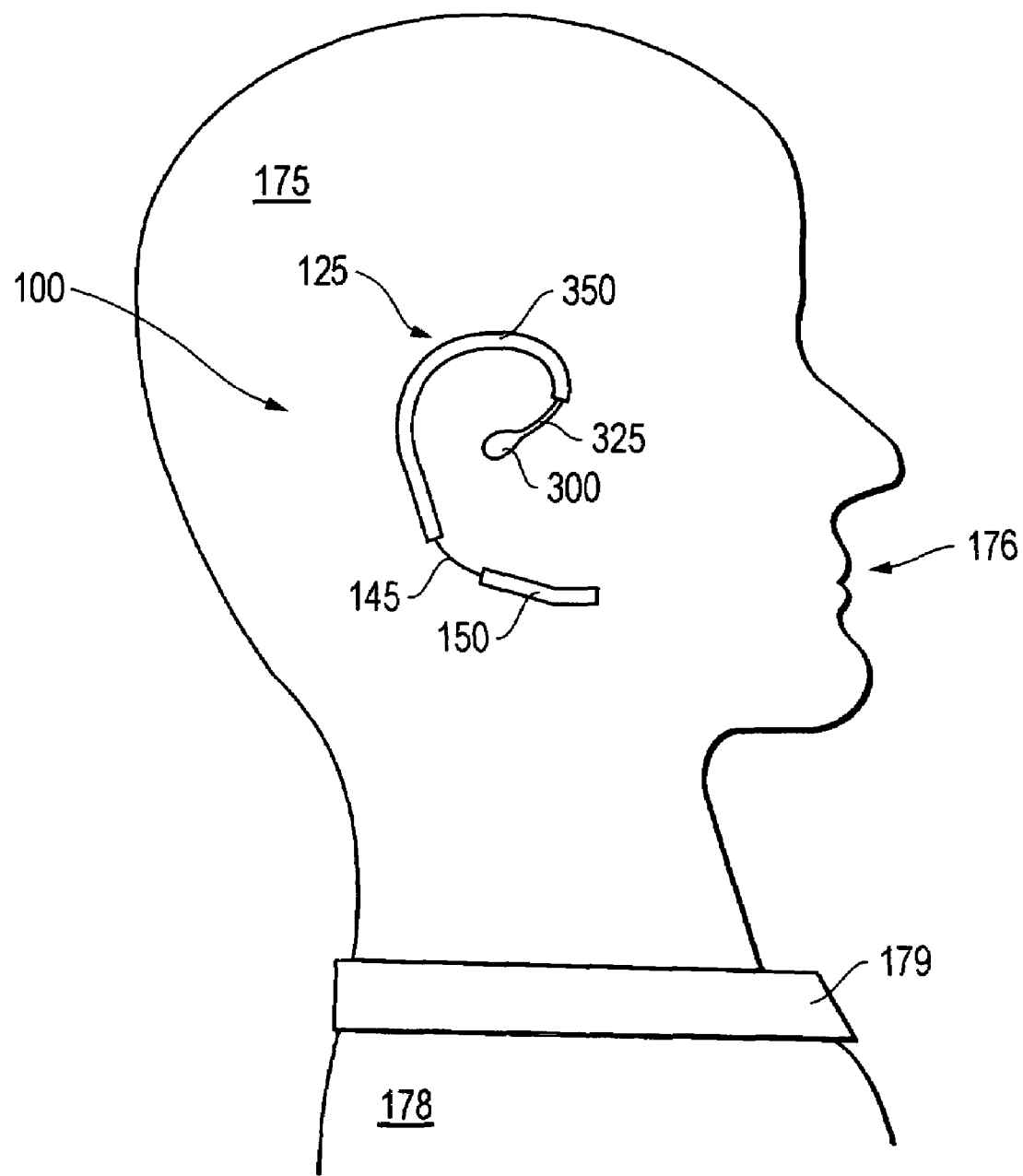
FIG. 1 is a side view of an embodiment of a wireless earpiece assembly worn by a user.

Referring to FIG. 1, an embodiment of a wireless earpiece assembly 100 is shown. The wireless earpiece assembly 100 is an earpiece assembly incorporating some wireless capacity. In the embodiment of FIG. 1, wireless transmission may come from a component within a casing 150, as described further herein. The wireless earpiece assembly 100 also includes a single earpiece portion 125 with an ear support 350 and a speaker 300 for delivery of sound to an ear 177 of a user 175. However, a dual ear configuration may also be employed. For example, in one embodiment, multiple wireless earpiece assemblies 100 may be employed simultaneously, perhaps for reception of stereo quality sound.

Figure 2:
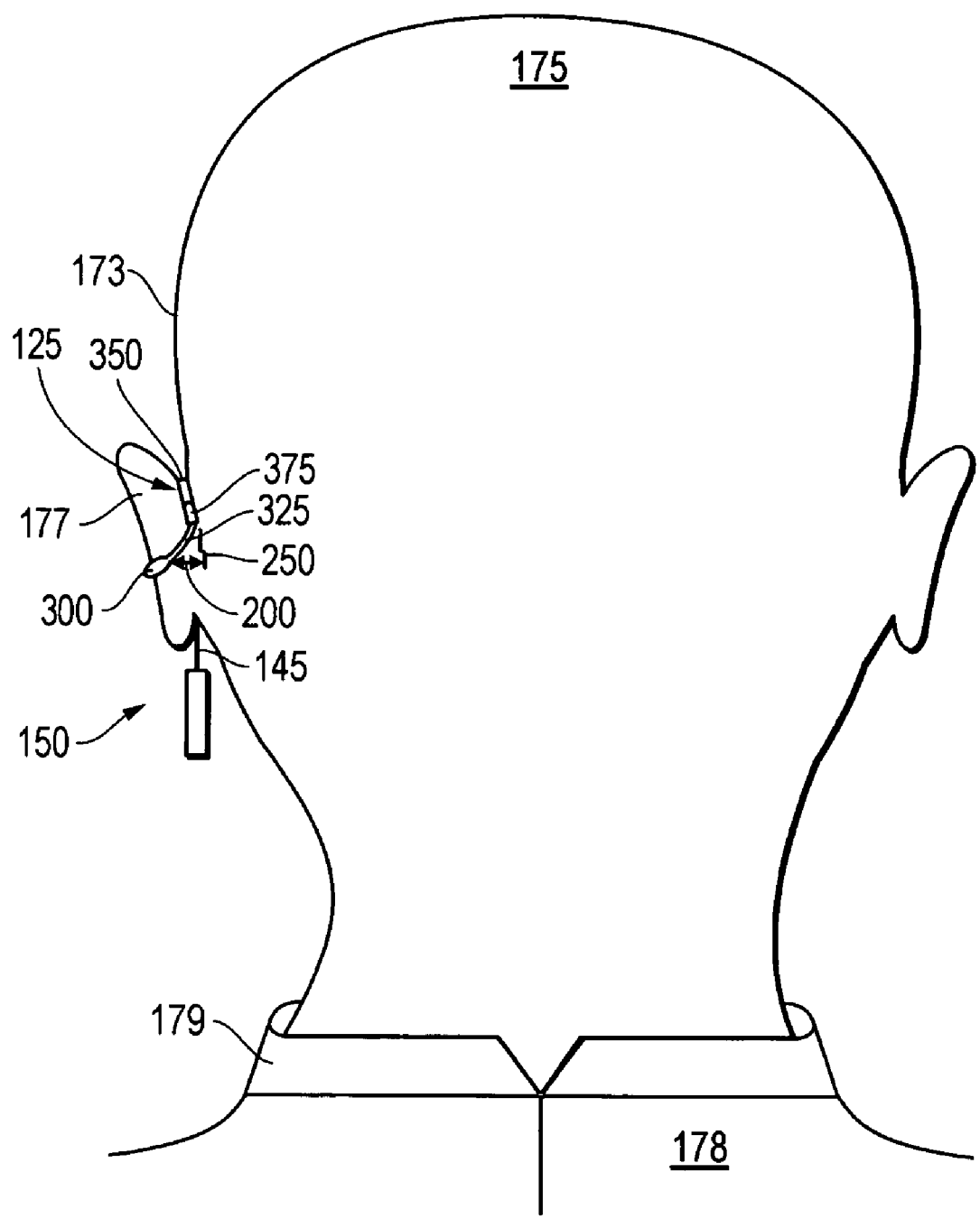
FIG. 2 is a front view of the wireless earpiece assembly of FIG. 1 worn by a user.

Referring to FIGS. 1 and 2, and as described in greater detail herebelow, the wireless earpiece assembly 100 is a single piece assembly of unitary construction with no extraneous wires or cumbersome features extending therefrom. Furthermore, the wireless earpiece assembly 100 is exclusively and entirely supported from the ear support 350 when secured behind the ear 177 as shown. The ear support 350 is the only portion of the entire assembly 100 for physically contacting the user 175. As viewed in FIG. 2, the ear support 350 itself is no more than about 0.25 inches across between the ear 177 and the head 173 of the user 175. As a result, no bulky crammed components or features of the wireless earpiece assembly 100 are sandwiched behind the ear 177 or left covering it. Rather, as described further herein, the significant bulk of the wireless earpiece assembly 100, in the form of a casing 150, is positioned away from the area behind or covering the user's ear 177 to a location above the users neckline or collar 179 when in use. This configuration drastically enhances user comfort for long term wear of a wireless earpiece assembly 100.

As noted above, the single earpiece portion 125 is shown secured behind an ear 177 of a user 175. The earpiece portion 125 is physically coupled to the casing 150, described above, via a casing support 145. The casing support 145 is a low profile extension, generally less than 0.25 inches in width, which displaces bulk of the casing 150 and allows for communication between the earpiece portion 125 and components 400 within the casing 150 as described further herein (see FIG. 4).

As also indicated above, the casing support 145 displaces the bulk of the casing 150 away from the user's ear 177 to a location above a neckline of the user 175. With reference to FIGS. 1 and 2, the neckline would be located at or below the collar 179 of the upper garment 178 shown. Thus, the length of the casing support 145 may typically be between about 0.25 to 5.0 inches from the ear support 350 to the casing 150, more preferably from about 0.5 to 2.5 inches. Displacing the bulk of the casing 150 in this manner significantly improves the long term comfort for the user 175. For example, no significant bulk is now present behind, nor covering, the user's ear 177. In fact, bulk behind the user's ear 177 is limited to the very narrow ear support 350 as described.

The casing support 145 described above is coupled to the casing 150 and ear support 350 by conventional means. In order to provide electrical conductivity, the casing support 145 may include an electrically conductive core. For example, in one embodiment, the casing support 145 may be dual conductor wiring akin to conventional speaker wiring. The casing 150 may suspend loosely from the ear support 350 by way of a pliant or loosely conforming casing support 145 akin to a dangling earring. A focused microphone such as an array microphone 429 may be incorporated into the casing 150 to enhance audio reception thereat should the casing 150 dangle behind the user's ear 177 as indicated in this embodiment (see also FIG. 4).

In the embodiment shown, the casing support 145 is configured to support the casing 150 in a lateral direction. That is, the casing support 145 stably conforms to position the casing 150 substantially toward the front of the user 175. In this manner, a microphone 429 of the casing 150 may be directed toward the user's mouth 176 as described further herein (see FIG. 4).

In order to achieve both conductivity and stable conformation as described above, embodiments of a casing support 145 may include between about 8 and about 20 gauge dual conductor metal wiring, most preferably of copper. However, the particular gauge, overall dimensions, and materials selected for the casing support 145 will be based in part on the weight of the supported casing 150. For example, in one embodiment, the casing support 145 may include 10-16 gauge dual copper wiring, with each line independently insulated with up to about 15 mils of a polyethylene, nylon, or other conventional insulating jacket. Such a casing support 145 would reliably and stably support a casing 150 in excess of about 0.75 ounces as shown in FIG. 1. Additionally, in this embodiment, the casing support 145 would be no wider across, in diameter or otherwise, than about 0.2 inches, well sized for coupling to closely sized conventional wiring or other conductive means through the ear support 350. Alternatively, the casing support 145 may include conventional higher gauge wiring through a non-compliant cylindrical passage positioned as shown in FIG. 1.

In the embodiment of FIG. 1, the stability and compliant nature of the casing support 145 is shown in the user-defined positioning of the casing 150 directed toward the user's mouth 176. The conformation of the casing support 145 may be a result of the user 175 manually shaping the casing support 145 by manipulation of the casing 150 position. The user 175 is able to precisely position the casing 150 toward the mouth 176 in a manner not touching or physically irritating to the user 175. Thus, the casing 150 and any accompanying bulk is displaced away from the user's ear 177 and maintained generally away from any surface of the user 175, further enhancing user comfort, especially for extended wear of the wireless earpiece assembly 100. Furthermore, the stable nature or heavy gauge of the casing support 145 allows it to retain its shape once conformed thereto by the user 175. Thus, the user 175 also need not continually shape and position the casing support 145 upon each use of the wireless earpiece assembly 100.

As descibed further herein, a substantial portion of the bulk of the wireless earpiece assembly 100 is found at the casing 150 where a plurality of components 400 (i.e. multiple components 400) of the wireless earpieace assembly 100 may be housed. As such components 400 continue to become lighter and potentially smaller over time, discomfort to the user 175 as a result solely of the weight of the casing 150 continues to diminish. However, by displacing the casing 150 itself as shown, discomfort due to the bulk of the casing 150 is immediately and substantially eliminated altogether. Furthermore, while the weight of the casing 150 is shown supported ultimately from the ear support 350 and back of the user's ear 177, a portion of the weight of the casing 150 may be support from another ear location. For example, in an alternate embodiment, the casing 150 may be coupled to an outer ear location, such as an ear lobe of the user's ear 177 to help support a portion of the weight of the casing 150. In this embodiment, the casing 150 may remain coupled to the earpiece portion 125 for communication with the assembly 100, while physical coupling to an outer ear location for support of some, if not all, of the weight of the casing 150.

Addressing user comfort as described above, by displacement of the bulk of the casing 150, is achieved in a manner employing negligible, if any, actual wiring, in the conventional sense. That is, the wireless earpiece assembly 100 includes no wiring beyond what may be present between the speaker 300 and the casing 150. The configuration of the wireless earpiece assembly is unitary with no cumbersome wiring to interfere with the user's natural hand or body movements. There is no wiring even present within the user's own line of sight. However, to the extent that portions of the wireless earpiece assembly 100, such as the casing 150, may be visible to others, size, shape, color, and other characteristics may be employed dependent on the aesthetic preferences of the user 175.

Figure 3:
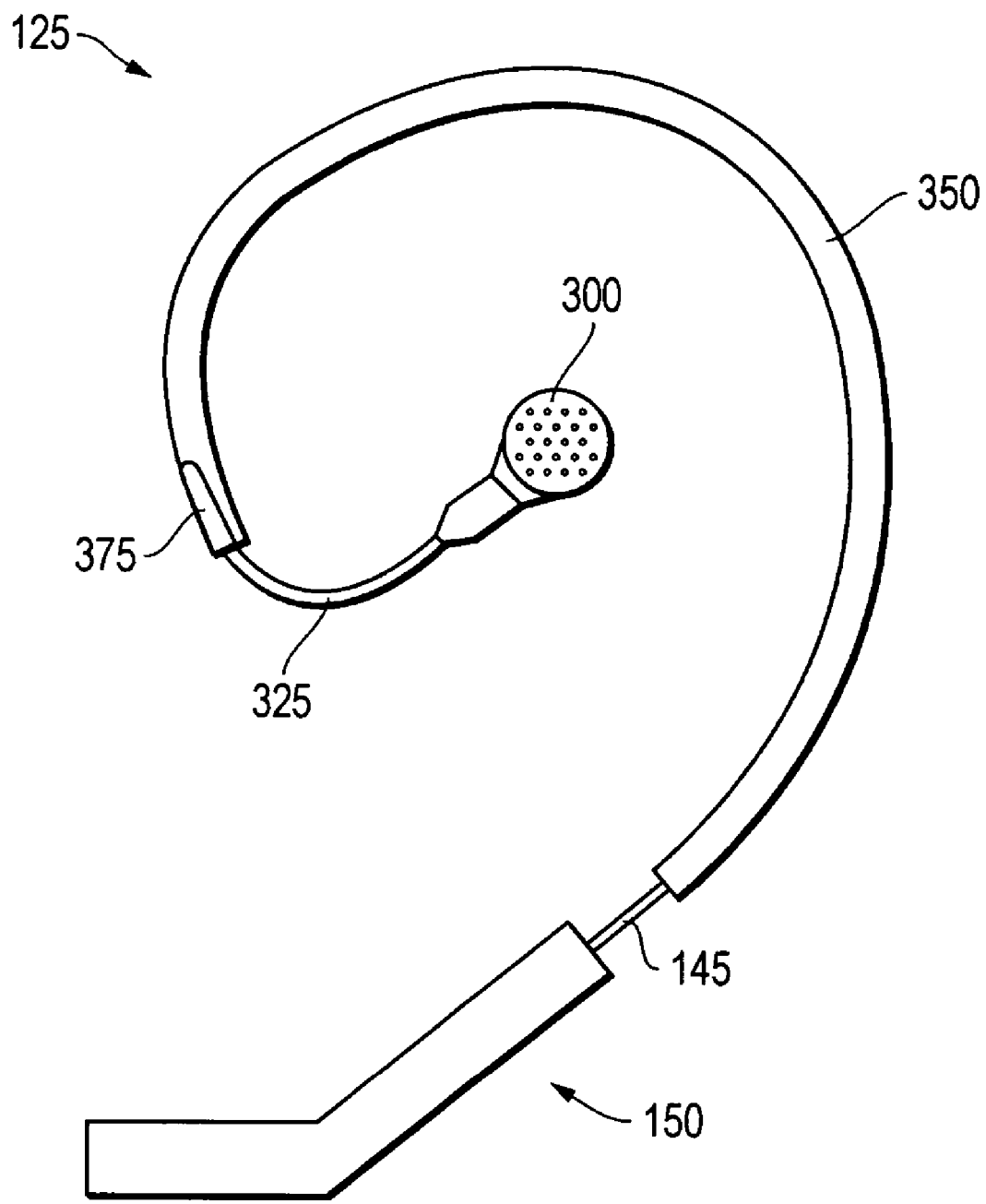
FIG. 3 is an opposing side view of the wireless earpiece assembly of FIG. 1.

Referring now to FIGS. 2 and 3, particular features of one embodiment of an earpiece portion 125 of the assembly 100 are described in greater detail. In the embodiment shown, the earpiece portion 125 includes an ear support 350 for wrapping around and behind the ear 177 of a user 175, keeping the entire wireless earpiece assembly 100 stabilized. The ear support 350 may be of a conventional plastic or polymer material, including fluoropolymers and polymer foams. In fact, any compatible material having both stable and somewhat flexible physical characteristics for placement and use as shown in FIG. 2 may be employed.

The ear support 350 described above may have a width of less than about 0.25 inches, providing a comfortable fit between the ear 177 and the head 173 of a typical user 175. Additionally, the overall size of the ear support 350 may be determined according to common ear sizes. For example, measuring in a diameter-like fashion, the ear support 350 may be between about 2.0 inches and about 2.5 inches across at its widest portion or 3 to 4 inches circumferentially. However, other sizes may be made available. Additionally, some combination of wiring between the ear support 350 and casing support 145, as well as portions of the speaker support 325 and casing support 145 themselves, may removably pass through the ear support 350, as described further herein. In this manner, one size ear support 350 may be removed and replaced with one of a different size.

The ear support 350 is stably supported by an ear 177 of a user 175 when in place for use (see FIGS. 1 and 2). Therefore, the ear support 350 is a good candidate location for accommodating an actuator 375 as shown, which may be physically manipulated by the user 175. In fact, the actuator 375 may be located at the front of the ear support 350 as this location is both easily manually accessible to the user 175 and stably supported by the ear 177 of the user 175.

In one embodiment, the actuator 375 described above is a button for physical manipulation by the user 175. For example, when the wireless earpiece assembly 100 is paired to a cell phone, the user 175 may press the actuator 375 to achieve communication with a microprocessor 460 shown in FIG. 4 to direct acceptance of an incoming phone call over the wireless earpiece assembly 100 fom the cell phone.

A light emitting diode (LED) may further be incorporated into the wireless earpiece assembly 100 to visually indicate an incoming call, pairing with a cell phone, or provide other indications (e.g. when the wireless earpiece assembly 100 is near the user and not being worn). In one embodiment, the actuator 375 itself may be an LED button. In another embodiment, the actuator 375 may be a motion detector, light sensor, or other electronic reader to enhance the stability of the entire wireless earpiece assembly 100 during use by allowing physical manipulation thereof by the user 175 to be achieved by a mere manual touching or covering of the actuator 375.

Regardless the application, the actuator 375, is the controlling physical interface between the user 175 and the wireless earpiece assembly 100. As a result, the physical security and stability of the wireless earpiece assembly 100 is of greatest concern at the site of the actuator 375. Therefore, in embodiments shown, the actuator 375 is located at the ear support 350 rather than, for example, at the casing 150 or other location, where regular physical manipulation risks user discomfort or displacement of the wireless earpiece assembly 100.

Continuing with reference to FIGS. 2 and 3, wiring through the ear support 350 terminates at a speaker support 325. The speaker support 325 is physically coupled to the ear support 350 by conventional means. The speaker support 325 in the embodiment shown is configured similar to the casing support 145 described above. For example, in order to maintain electrical conductivity to the speaker 300, the speaker support 325 may include an electrically conductive core.

The speaker support 325 may be a dual conductor wiring with a configuration akin to conventional speaker wiring. In this manner, the speaker 300 may be conductively employed by conventional means. However, in the embodiment shown, the speaker support 325 is also configured to support the speaker 300 with a separation 200 as described further below. Therefore, the speaker support 325 may be of heavy gauge wiring configured to retain a manually user-defined shape. That is, the speaker support 325 may be conformed to a stable and naturally retainable configuration by a user 175 as shown in FIG. 2. Alternatively, the speaker support 325 may include conventional higher gauge wiring through a non-compliant cylindrical passage positioned as shown.

In order to achieve both conductivity and stable conformation, embodiments of a speaker support 325 may include between about 8 and about 20 gauge dual conductor metal wiring, most preferably of copper. However, the particular gauge, overall dimensions, and materials selected for the speaker support 325 will be based in part on the weight of the supported speaker 300. For example, in one embodiment, the speaker support 325 may include 16-18 gauge dual copper wiring, with each line independently insulated with up to about 15 mils of a polyethylene, nylon, or other conventional insulating jacket. Such a speaker support 325 would reliably and stably support a conventional earpiece speaker 300 of at least about 0.25 ounces. Additionally, in this embodiment, the speaker support 325 would be no wider across, in diameter or otherwise, than about 0.2 inches, well sized for coupling to closely sized conventional wiring or other conducting means through the ear support 350 and to the casing support 145.

Referring specifically to FIG. 2, the stability and conformable nature of the speaker support 325 is shown in the user-defined separation 200 that is formed and stably maintained between the speaker 300 and an adjacent ear surface 250. The speaker 300 is shown positioned in line with an auditory canal of the user 175. As described above, the separation 200 may be a result of the user 175 manually shaping or bending the speaker support 325 to the conformation shown based on the user's own personal preference and comfort. Thus, the user 175 is able to keep the speaker 300 off of the ear 177 and ear surface 250 allowing for greater user comfort, especially where the user175 employs the earpiece portion 125 for an extended period of time.

The above-noted separation 200 may be anywhere up to about 0.5 inches depending on the comfort or preference of the user 175. The separation 200 also allows the ear 177 and auditory canal of the user 175 to remain open and unblocked for hearing other sound when the wireless earpiece assembly 100 is in place but not in use. Therefore, the wireless earpiece assembly 100 need not be removed and replaced continuously in order to facilitate good hearing of sound emanating from outside the speaker 300 between uses. Furthermore, the stable nature or heavy gauge of the speaker support 325 allows it to retain its shape once conformed thereto by the user 175. Thus, the user 175 also need not continually shape and position the speaker support 325 upon each use of the earpiece portion 125.

Given the presence of a separation 200 as described above, the speaker 300 employed may be directional in nature. That is, the speaker 300 may employ available and evolving hypersonic sound (HSS) capacity in order to focus or direct sound to the auditory canal of the user 175. In this way, the sound transferred from the speaker 300 is focused across the separation 200, specifically to the user 175. Thus, the separation 200, provided for the comfort of the user 175 is not achieved at the expense of maintaining quality and personal integrity of the sound transferred from the speaker 300 to the user 175. Rather, employing hypersonic sound (HSS) capacity in the speaker 300 delivers quality sound to the user 175 and prevents others nearby from overhearing or being distracted by the sound emanating from the speaker 300.

Figure 4:
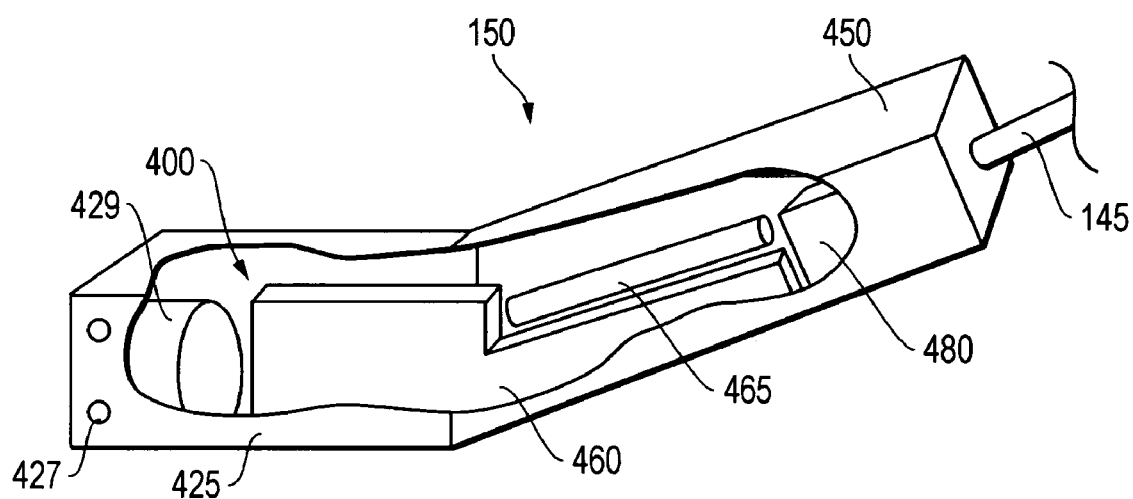
FIG. 4 is a perspective sectional view of a casing of the wireless earpiece assembly of FIG. 1.

Referring now to FIGS. 2 and 4, the casing 150 is described in further detail. In the embodiment shown, the casing 150 with components 400 therein, includes a significant portion of the bulk or volume of the entire wireless earpiece assembly 100, perhaps more than about half. Therefore, in the embodiment shown, most of the bulk of the wireless earpiece assembly 100 is maintained at a user-friendly location avoiding discomfort to the user 175 therefrom.

With particular attention to FIG. 4, the casing 150 includes an outer shell 450 configured to house several components 400 of the wireless earpiece assembly 100. In the embodiment shown, the casing 150 includes a microprocessor 460 coupled to other components 400 of the casing 150 for directing interaction therebetween. The casing 150 further includes a microphone portion 425 with a microphone 429 resting adjacent sound inlets 427. In the embodiment shown, the microphone portion 425 is at an angle, which, when the wireless earpiece assembly 100 is employed, helps direct the microphone 429 toward a mouth 176 of the user 175 (see FIG. 1). This further adds to the overall compact spiraling and unitary configuration of the wireless earpiece assembly 100 as is apparent in FIG. 1.

Additional components 400 of the casing 150 shown in FIG. 4, include a conventional transceiver and antenna assembly 465 along with a power source 480 for the wireless earpiece assembly 100. In fact, the more components 400 accommodated by the casing 150, the less the overall bulk of the wireless earpiece assembly 100 that must be borne at the ear 177 of the user 175.

Figure 5:
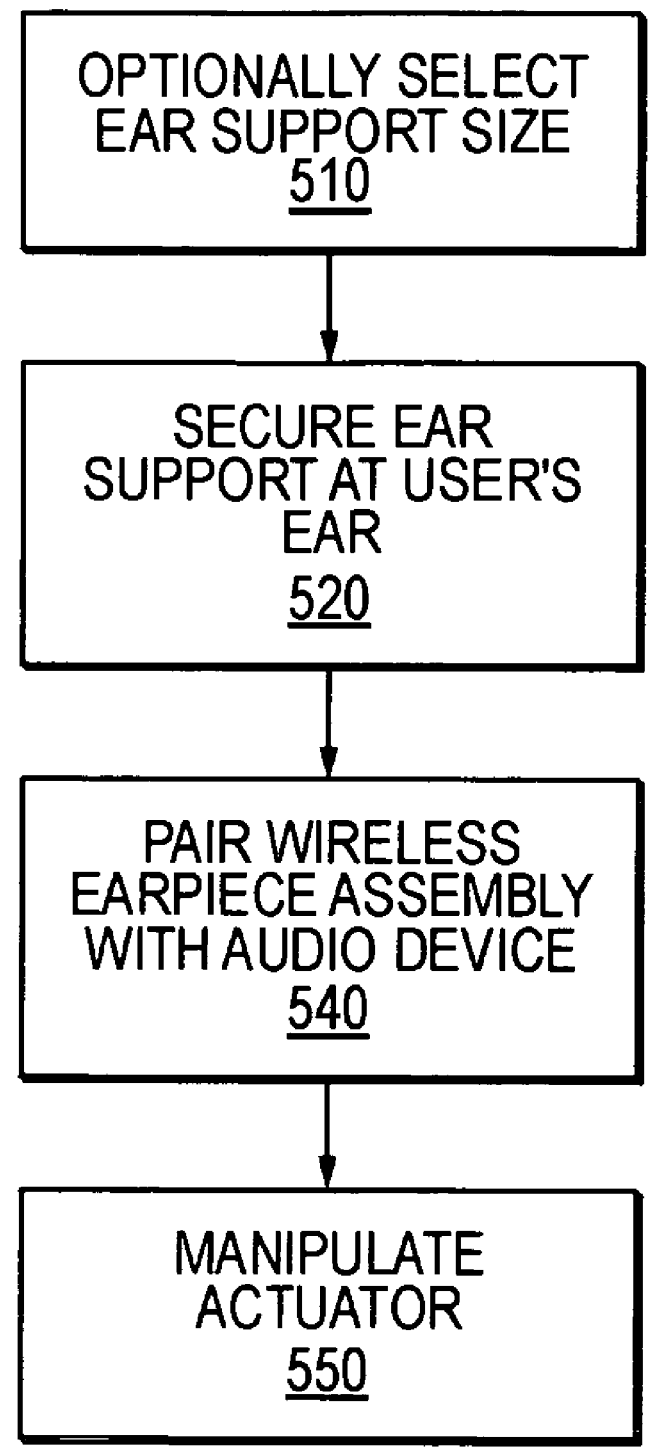
FIG. 5 is a flow chart summarizing an embodiment of employing a wireless earpiece assembly.

Referring now to the flow-chart of FIG. 5, and with additional reference to FIGS. 1-4, an embodiment of employing a wireless earpiece assembly 100 is described. As referenced above, the wireless earpiece assembly 100 may be fitted with an ear support 350 of a particular size and shape according to preference of the user 175 as indicated at 510.

Once configured for size to the liking of the user 175, a wireless earpiece assembly 100 may be positioned for use by securing an ear support 350 behind the ear 177 of the user 175 (as indicated at 520). Once in place, the wireless earpiece assembly 100 may be wirelessly coupled or "paired" to an audio device as indicated at 540. For example, the wireless earpiece assembly 100 may be paired to a mobile audio device such as a cell phone in order to provide the user 175 with a more hands-free user-friendly mode of communication. Additionally, control of the wireless communication between the wireless earpiece assembly 100 and the audio device may be directed by the user 175 through manipulation of an actuator 375 at the ear support 350 as indicated at 550.

Embodiments described above provide a wireless earpiece assembly 100 configured to minimize the uncomfortable effects of bulk placed at a user's ear 177 when employing such an assembly 100, especially during long term wear. The embodiments described also simultaneously optimize the user-friendly and hands-free advantages afforded by wireless technology, for example, by employing no conventional extraneous or cumbersome wiring.

Although exemplary embodiments describe particular wireless earpiece assemblies configured with a casing displaced such that only a narrow ear support contacts the user behind the user's ear, additional embodiments are possible. For example, the wireless earpiece assembly may be configured for pairing to a host of devices, such as radios or other audio devices, and not limited to mobile cell phones as described hereinabove. Furthermore, many changes, modifications, and substitutions may be made without departing from the spirit and scope of the described embodiments. For a period following publication of this application and/or patent, a copy hereof may be made available at www.Licentia-IP.com.

I claim:

1. A wireless earpiece assembly comprising:
    an ear support having a portion for positioning a speaker at a user's ear;
    a casing coupling to a portion of said ear support and of a bulk for housing a plurality of components of the earpiece assembly; and
    a casing support to provide the coupling and displace the bulk of said casing to a location between the user's ear and a neckline of the user, the bulk of said casing exceeding that of said ear support and that of said casing support.

2. The wireless earpiece assembly of claim 1 wherein said casing support is between about 0.25 inches and about 5.0 inches in length.

3. The wireless earpiece assembly of claim 1 wherein said casing support is less than about 0.25 inches wide.

4. The wireless earpiece assembly of claim 1 wherein the plurality of components includes one of a transceiver and antenna assembly, a power source, a microprocessor, and a microphone.

5. The wireless earpiece assembly of claim 1 wherein said casing support is of a stable conformation for supporting said casing in a lateral direction toward a mouth of the user.

6. The wireless earpiece assembly of claim 5 wherein said casing support is wiring of between about 8 gauge and about 20 gauge.

7. The wireless earpiece assembly of claim 1 wherein the portion of said ear support for positioning a speaker at a user's ear and the portion of said ear support coupling to said casing are different portions.

8. A wireless earpiece assembly comprising:
    an ear support having a portion for positioning a speaker at a user's ear;
    a casing coupling to another portion of said ear support and housing a focused microphone; and
    a casing support to provide the coupling and displace the bulk of said casing away from the ear to a location above a neckline of the user, the bulk of said casing exceeding that of said ear support and that of said casing support.

9. The wireless earpiece assembly of claim 8 wherein said casing support is of a pliant conformation for loosely suspending said casing from said ear support.

10. The wireless earpiece assembly of claim 8 wherein said ear support is configured to occupy less than about 0.25 inches in width between the ear of the user and a head of the user.

11. The wireless earpiece assembly of claim 8 wherein said ear support further comprises an actuator to serve as a physical controlling interface for the user.

12. A wireless earpiece assembly comprising:
   an ear support having a portion for positioning a speaker at a user's ear and an actuator to serve as a physical controlling interface for the user;
   a casing coupling to another portion of said ear support and housing a plurality of components of the earpiece assembly; and
   a casing support to provide the coupling and displace a bulk of said casing away from the ear to a location above a neckline of the user, the bulk of said casing exceeding that of said ear support and that of said casing support.

13. The wireless earpiece assembly of claim 12 wherein said actuator is located at a front of said ear support.

14. The wireless earpiece assembly of claim 12 wherein the actuator is one of a button for pressing by the user and an electronic reader for covering by the user.

15. An earpiece comprising:
   an ear support for positioning behind a user's ear and securing the earpiece thereat;
   a speaker for delivering sound to the user's ear; and
   a conformable elongated speaker support extending from a first end thereof coupled to said ear support to a second end thereof coupled to said speaker to maintain a user-defined separation between said speaker and the user's ear, said speaker equipped with hypersonic sound delivery capacity to direct the sound across the separation to the user's ear during the delivering.

16. The earpiece of claim 15 wherein the separation is up to about 0.5 inches.

17. The earpiece of claim 15 wherein said ear support is configured to occupy less than about 0.25 inches of width behind the ear.

18. The earpiece of claim 15 further comprising:
   a casing coupling to said ear support and housing a wireless component, said casing of a bulk exceeding that of said ear support; and
   a casing support to provide the coupling and displace the bulk of said casing away from the user's ear to a location above a neckline of the user.

19. The earpiece of claim 18 wherein said casing support is less than about 0.25 inches wide.

20. A method of wirelessly employing earpiece assemblies and comprising:
   securing an ear support of a first earpiece assembly at a user's first ear; and
   securing an ear support of a second earpiece assembly at a user's second ear, the first earpiece assembly and the second earpiece assembly each further including a speaker, a casing for housing a plurality of components of the respective assembly, and a casing support to displace bulk of the casing away from the respective ear to a location above a neckline of the user, the bulk exceeding that of the ear support and the casing support.

21. The method of claim 20 further comprising delivering stereo sound to the user's first and second ears with the speakers of the first and second earpiece assemblies.

\* \* \* \* \*

(12) INTER PARTES REEXAMINATION CERTIFICATE (821st)
United States Patent
Ryann

(10) Number: US 7,505,793 C1
(45) Certificate Issued: Feb. 10, 2014

(54) WIRELESS EARPIECE ASSEMBLY

(76) Inventor: William Frederick Ryann, San Antonio, TX (US)

Reexamination Request:
No. 95/002,107, Aug. 29, 2012

Reexamination Certificate for:
Patent No.: 7,505,793
Issued: Mar. 17, 2009
Appl. No.: 11/218,392
Filed: Aug. 29, 2005

(51) Int. Cl.
*H04M 1/00* (2006.01)

(52) U.S. Cl.
USPC ......... 455/569.1; 381/314; 381/77; 455/41.2; 455/575.1; 455/575.6; 455/575.7

(58) Field of Classification Search
None
See application file for complete search history.

(56) References Cited

To view the complete listing of prior art documents cited during the proceeding for Reexamination Control Number 95/002,107, please refer to the USPTO's public Patent Application Information Retrieval (PAIR) system under the Display References tab.

*Primary Examiner* — Majid A. Banankhah

(57) ABSTRACT

A wireless earpiece assembly configured to physically contact a user exclusively at an ear support behind a user's ear when in use. The ear support does not exceed about 0.25 inches in width. The assembly is configured to distribute a significant portion of its bulk away from the isolated location of a user's ear for long term user comfort without sacrifice of audio or communicational integrity. The wireless earpiece assembly simultaneously eliminates the use of any conventional extraneous wiring in order to optimize the un-encumbering user-friendly advantages afforded by wireless technology.

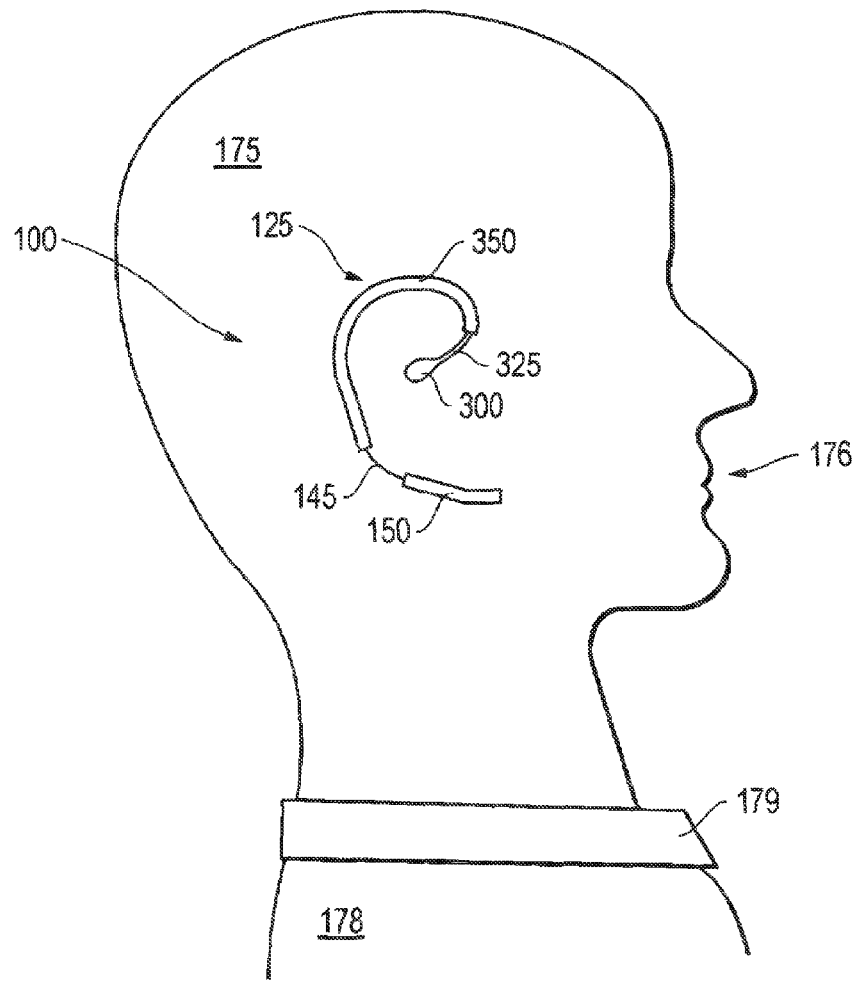

INTER PARTES REEXAMINATION CERTIFICATE ISSUED UNDER 35 U.S.C. 316

THE PATENT IS HEREBY AMENDED AS INDICATED BELOW.

AS A RESULT OF REEXAMINATION, IT HAS BEEN DETERMINED THAT:

Claims 1-4, 7, 12-14, 20 and 21 are cancelled.

Claims 5, 6, 8-11 and 15-19 were not reexamined.

\* \* \* \* \*